US012688560B2

(12) United States Patent
Li et al.

(10) Patent No.: US 12,688,560 B2
(45) Date of Patent: Jul. 21, 2026

(54) GENERALIZED MOVING TEXT REGION DETECTION FOR BROKEN TEXT RECOVERY

(71) Applicant: Samsung Electronics Co., Ltd., Suwon-si (KR)

(72) Inventors: Zhong Li, Aliso Viejo, CA (US); Yoon kyung Kim, Lake Forest, CA (US); Hunsop Hong, Irvine, CA (US); Seongnam Oh, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 18/488,858

(22) Filed: Oct. 17, 2023

(65) Prior Publication Data

US 2024/0412340 A1      Dec. 12, 2024

Related U.S. Application Data

(60) Provisional application No. 63/471,724, filed on Jun. 7, 2023.

(51) Int. Cl.
    *G06T 5/73*          (2024.01)
    *G06V 30/14*         (2022.01)
    (Continued)

(52) U.S. Cl.
    CPC ............ *G06T 5/73* (2024.01); *G06V 30/1444* (2022.01); *G06V 30/147* (2022.01); *G06V 30/148* (2022.01); *G06V 30/1801* (2022.01)

(58) Field of Classification Search
    None
    See application file for complete search history.

(56) References Cited

U.S. PATENT DOCUMENTS 6,009,199 A    12/1999  Ho
6,681,053 B1    1/2004  Zhu
(Continued)

FOREIGN PATENT DOCUMENTS

CN        112801090 A      5/2021
CN        114240791 A      3/2022
(Continued)

OTHER PUBLICATIONS

Tibermacine et al. "An End-to-End Trainable Capsule Network for Image-Based Character Recognition and its Application to Video Subtitle Recognition", ICTACT Journal on Image and Video Processing, Feb. 2021, vol. 11, Issue: 03 (Year: 2021).*
Baek, Y., et al., "Character Region Awareness for Text Detection", 2019 IEEE/CVF Conference on Computer Vision and Patter Recognition (CVPR), Apr. 3, 2019, pp. 9365-9374, IEEE, United States.
Tang, Y. et al. "Scene text detection and segmentation based on cascaded convolution neural networks." IEEE transactions on Image Processing 26, Jan. 20, 2017, pp. 1509-1520, No. 3, IEEE, United States [Abstract Only].
(Continued)

*Primary Examiner* — Saptarshi Mazumder
(74) *Attorney, Agent, or Firm* — Sherman IP LLP; Kenneth L. Sherman; Steven Laut

(57)              ABSTRACT

One embodiment provides a method comprising receiving content for presentation on a display, and obtaining a plurality of image patches from the content. Each image patch is segmented from a bottom and horizontal-center portion of a sub-sampled grayscale image of a frame of the content. The method further comprises applying a searching algorithm to the plurality of image patches to detect a region of interest of moving text in the content. The searching algorithm utilizes a first set of features and a second set of features to detect the region of interest with respect to a vertical axis and a horizontal axis of the display, respectively. The method further comprises correcting one or more visual artifacts in the region of interest, where the one or more visual artifacts include broken text.

20 Claims, 9 Drawing Sheets

(51) Int. Cl.
    *G06V 30/146*     (2022.01)
    *G06V 30/148*     (2022.01)
    *G06V 30/18*     (2022.01)

(56)           References Cited

U.S. PATENT DOCUMENTS

| | | | |
|---|---|---|---|
| 8,320,674 B2 | 11/2012 | Guillou et al. | |
| 8,503,780 B2 | 8/2013 | Chung et al. | |
| 9,451,206 B2 | 9/2016 | Chen et al. | |
| 9,524,430 B1 | 12/2016 | Cho | |
| 9,530,069 B2 * | 12/2016 | Manmatha | G06V 30/162 |
| 9,569,679 B1 | 2/2017 | Gray et al. | |
| 9,807,339 B2 | 10/2017 | Chen et al. | |
| 10,148,881 B2 * | 12/2018 | Beysserie | H04N 23/683 |
| 10,430,662 B2 | 10/2019 | Katz et al. | |
| 11,568,247 B2 | 1/2023 | Kadav et al. | |
| 2005/0105820 A1 | 5/2005 | Zhou et al. | |
| 2007/0286499 A1 * | 12/2007 | Freiburg | G06V 20/62 |
| | | | 382/229 |
| 2009/0016618 A1 | 1/2009 | Zhou | |
| 2009/0304266 A1 * | 12/2009 | Aoki | G06T 7/97 |
| | | | 382/154 |
| 2013/0156308 A1 * | 6/2013 | Abe | H04N 21/4325 |
| | | | 382/165 |
| 2014/0072219 A1 | 3/2014 | Tian | |
| 2014/0184912 A1 * | 7/2014 | Omprakash | G09G 5/003 |
| | | | 348/564 |
| 2019/0130187 A1 | 5/2019 | Hu et al. | |
| 2023/0113757 A1 * | 4/2023 | Chiang | G06V 30/147 |
| | | | 704/260 |
| 2023/0147550 A1 | 5/2023 | He et al. | |
| 2023/0197082 A1 | 6/2023 | Wang | |
| 2023/0325685 A1 | 10/2023 | Caba Heilbron et al. | |
| 2024/0169498 A1 * | 5/2024 | Shi | H04N 23/6812 |

FOREIGN PATENT DOCUMENTS

| | | |
|---|---|---|
| CN | 114296842 A | 4/2022 |
| CN | 115348362 A | 11/2022 |
| CN | 115359502 A | 11/2022 |
| JP | 2001-117529 A | 4/2001 |
| KR | 10-2009-0006724 A | 1/2009 |

OTHER PUBLICATIONS

International Search Report and Written Opinion dated Apr. 1, 2024 for International Application PCT/KR2024/004193, from Korean Intellectual Property Office, pp. 1-9, Republic of Korea.

Tsai, T. et al, "2DVTE: A two-directional videotext extractor for rapid and elaborate design", Pattern Recognition, pp. 2009, pp. 1496-1510, vol. 42, Elsevier.

Xu, Y., et al, "End-to-End Subtitle Detection and Recognition for Videos in East Asian Languages via CNN Ensemble with Near-Human-Level Performance", CV, Nov. 21, 2016, pp. 131-143, Signal Processing: Image Communication, United States.

Droettboom, M., "Correcting broken characters in the recognition of historical printed documents", 2003 Joint Conference on Digital Libraries, 2003, pp. 1-3, IEEE, United States.

Carvalho, P., et al., "Automatic TV Logo Identification for Advertisement Detection without Prior Data", Applied Sciences, Aug. 15, 2021, pp. 1-17, United States.

Elshahaby, H., "An end to end system for subtitle text extraction from movie", Journal of Ambient Intelligence and Humanized Computing, Oct. 25, 2021, pp. 1-2, vol. 4, Issue 6, United States.

U.S. Non-Final Office Action for U.S. Appl. No. 18/488,852 mailed Sep. 12, 2025.

Pal, A., et al., "Context-aware television-internet mash-ups using logo detection and character recognition, "Pattern Anal Applic., (2015) 18: pp. 191-205, Springer, United States.

Crandall, D., et al., "Extraction of special effects caption text events from digital video," IJDAR, 2003, pp. 138-157, United States.

Xu, Y., et al., "End-to-End Subtitle Detection and Recognition for Videos in East Asian Languages via CNN Ensemble", Signal Processing: Image Communication, 2018, pp. 131-143, United States.

U.S. Final Office Action for U.S. Appl. No. 18/488,852 mailed Feb. 10, 2026 by Examiner Edward Park.

U.S. Notice of Allowance for U.S. Appl. No. 18/488,852 mailed Apr. 21, 2026 by Examiner Edward Park.

U.S. Corrected Notice of Allowability for U.S. Appl. No. 18/488,852 mailed May 7, 2026 by Examiner Edward Park.

* cited by examiner

300

400

700

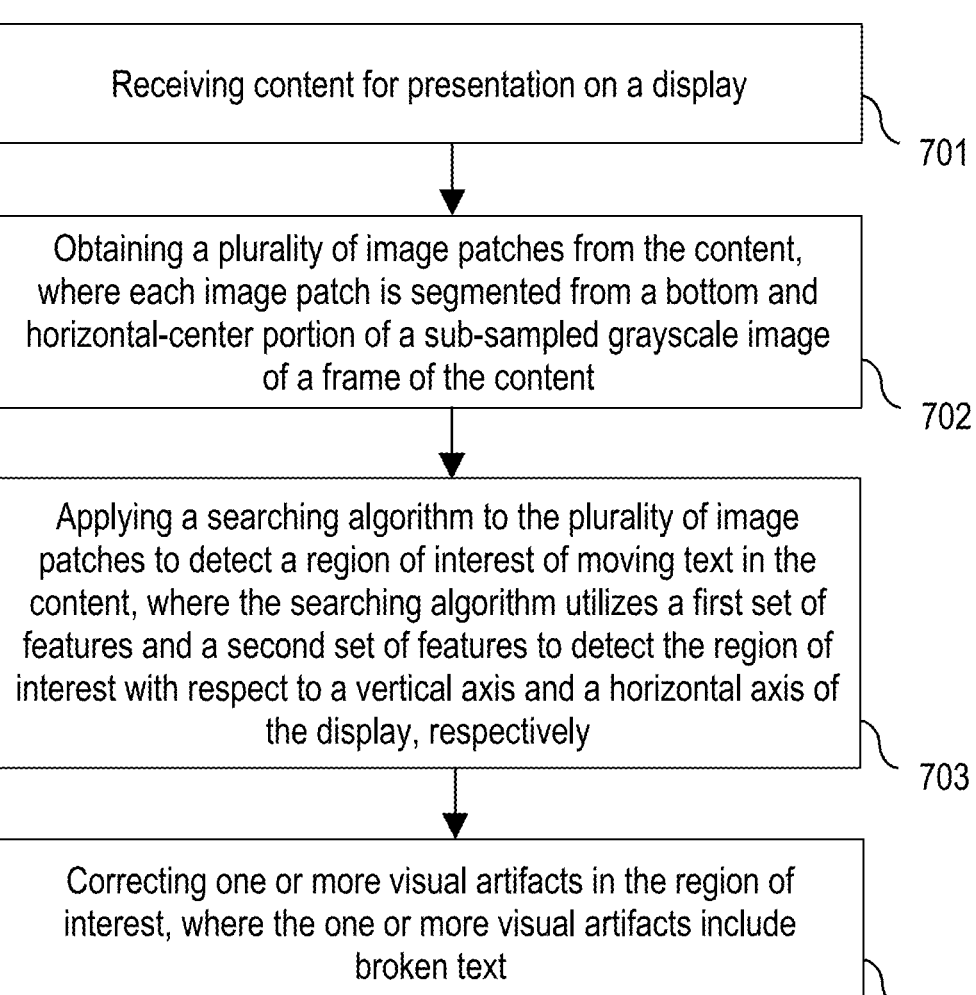

Receiving content for presentation on a display

701

Obtaining a plurality of image patches from the content, where each image patch is segmented from a bottom and horizontal-center portion of a sub-sampled grayscale image of a frame of the content

702

Applying a searching algorithm to the plurality of image patches to detect a region of interest of moving text in the content, where the searching algorithm utilizes a first set of features and a second set of features to detect the region of interest with respect to a vertical axis and a horizontal axis of the display, respectively

703

Correcting one or more visual artifacts in the region of interest, where the one or more visual artifacts include broken text

GENERALIZED MOVING TEXT REGION DETECTION FOR BROKEN TEXT RECOVERY

CROSS-REFERENCE TO RELATED APPLICATIONS

The present application claims priority to U.S. Provisional Patent Application No. 63/471,724, filed on Jun. 7, 2023, incorporated by reference in its entirety.

TECHNICAL FIELD

One or more embodiments generally relate to video processing, in particular, a method and system for generalized moving text region detection for broken text recovery.

BACKGROUND

Visual artifacts are anomalies or distortions apparent during visual representation of media (e.g., images, video). For example, visual artifacts may arise as a result of frame rate conversion.

SUMMARY

One embodiment provides a method comprising receiving content for presentation on a display, and obtaining a plurality of image patches from the content. Each image patch is segmented from a bottom and horizontal-center portion of a sub-sampled grayscale image of a frame of the content. The method further comprises applying a searching algorithm to the plurality of image patches to detect a region of interest of moving text in the content. The searching algorithm utilizes a first set of features and a second set of features to detect the region of interest with respect to a vertical axis and a horizontal axis of the display, respectively. The method further comprises correcting one or more visual artifacts in the region of interest, where the one or more visual artifacts include broken text.

Another embodiment provides a system comprising at least one processor and a non-transitory processor-readable memory device storing instructions that when executed by the at least one processor causes the at least one processor to perform operations. The operations include receiving content for presentation on a display, and obtaining a plurality of image patches from the content. Each image patch is segmented from a bottom and horizontal-center portion of a sub-sampled grayscale image of a frame of the content. The operations further include applying a searching algorithm to the plurality of image patches to detect a region of interest of moving text in the content. The searching algorithm utilizes a first set of features and a second set of features to detect the region of interest with respect to a vertical axis and a horizontal axis of the display, respectively. The operations further include correcting one or more visual artifacts in the region of interest, where the one or more visual artifacts include broken text.

A non-transitory processor-readable medium that includes a program that when executed by a processor performs a method comprising receiving content for presentation on a display, and obtaining a plurality of image patches from the content. Each image patch is segmented from a bottom and horizontal-center portion of a sub-sampled grayscale image of a frame of the content. The method further comprises applying a searching algorithm to the plurality of image patches to detect a region of interest of moving text in the content. The searching algorithm utilizes a first set of features and a second set of features to detect the region of interest with respect to a vertical axis and a horizontal axis of the display, respectively. The method further comprises correcting one or more visual artifacts in the region of interest, where the one or more visual artifacts include broken text.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 7 is a flowchart of an example process for implementing generalized moving text region detection for broken text recovery, in one or more embodiments.

DETAILED DESCRIPTION

Figure 1:
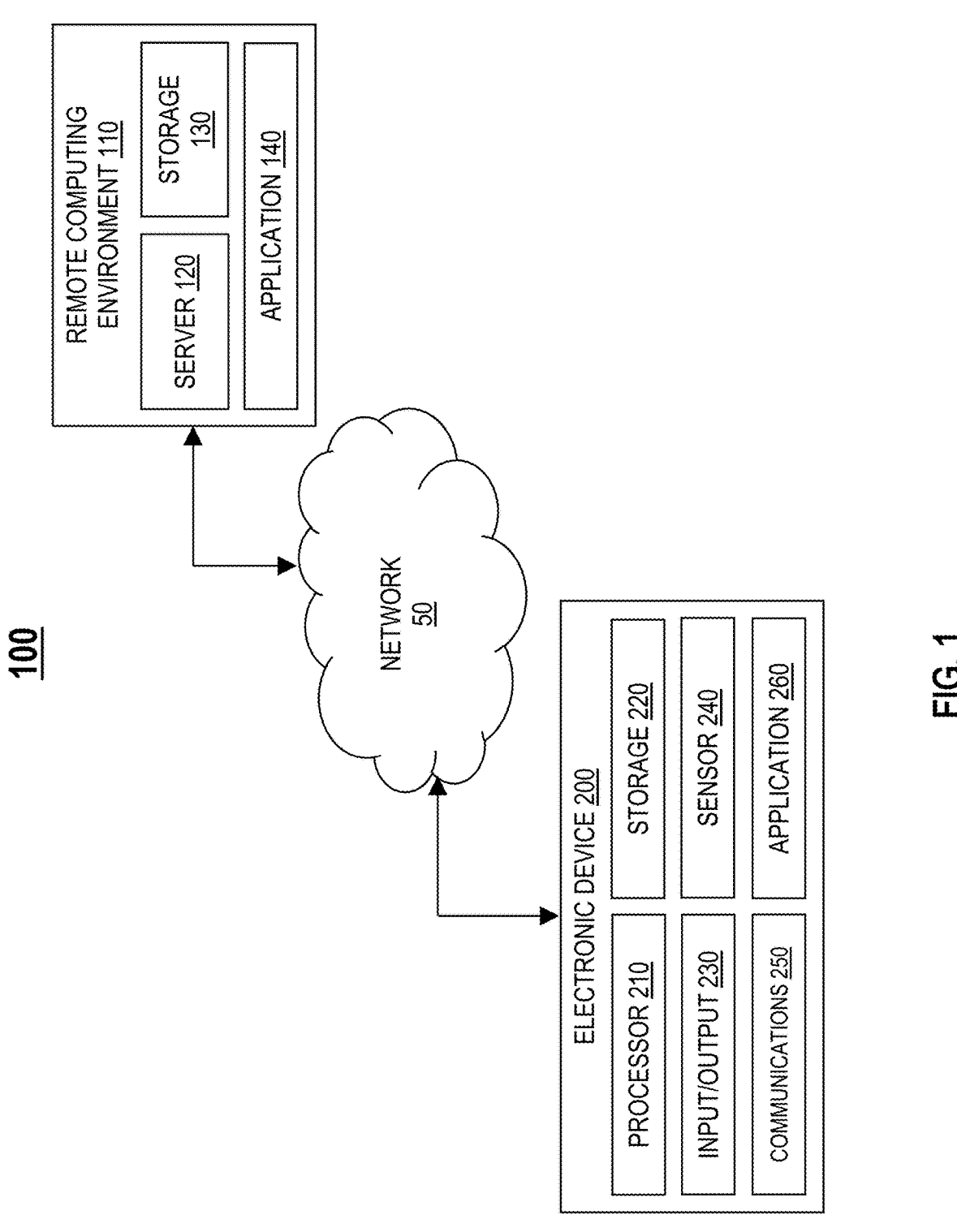
FIG. 1 illustrates an example computing architecture for generalized moving text region detection for broken text recovery, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to video processing, in particular, a method and system for generalized moving text region detection for broken text recovery. One embodiment provides a method comprising receiving content for presentation on a display, and obtaining a plurality of image patches from the content. Each image patch is segmented from a bottom and horizontal-center portion of a sub-sampled grayscale image of a frame of the content. The method further comprises applying a searching algorithm to the plurality of image patches to detect a region of interest of moving text in the content. The searching algorithm utilizes a first set of features and a second set of features to detect the region of interest with respect to a vertical axis and a horizontal axis of the display, respectively. The method further comprises correcting one or more visual artifacts in the region of interest, where the one or more visual artifacts include broken text.

Another embodiment provides a system comprising at least one processor and a non-transitory processor-readable memory device storing instructions that when executed by the at least one processor causes the at least one processor to perform operations. The operations include receiving content for presentation on a display, and obtaining a plurality of image patches from the content. Each image patch is segmented from a bottom and horizontal-center portion of a sub-sampled grayscale image of a frame of the content. The operations further include applying a searching algorithm to the plurality of image patches to detect a region of interest of moving text in the content. The searching algorithm utilizes a first set of features and a second set of features to detect the region of interest with respect to a vertical axis and a horizontal axis of the display, respectively. The operations further include correcting one or more visual artifacts in the region of interest, where the one or more visual artifacts include broken text.

A non-transitory processor-readable medium that includes a program that when executed by a processor performs a method comprising receiving content for presentation on a display, and obtaining a plurality of image patches from the content. Each image patch is segmented from a bottom and horizontal-center portion of a sub-sampled grayscale image of a frame of the content. The method further comprises applying a searching algorithm to the plurality of image patches to detect a region of interest of moving text in the content. The searching algorithm utilizes a first set of features and a second set of features to detect the region of interest with respect to a vertical axis and a horizontal axis of the display, respectively. The method further comprises correcting one or more visual artifacts in the region of interest, where the one or more visual artifacts include broken text.

For expository purposes, the term "moving text" as used in this specification generally refers to one or more lines of scrolling text displayed in content, and the term "moving text region" as used in this specification generally refers to an area or region of content that includes moving text. For expository purposes, the term "broken text" as used in this specification generally refers to moving text with visual artifacts (e.g., the moving text is distorted).

Some visual artifacts observed on a display device (e.g., a television) during presentation of content may originate from a source of the content itself. For example, the artifacts may result from erroneous frame rate conversion by a content provider if the frame rate of the content and a broadcasting system is different. Among various available frame rate conversions, 50 Hz to 60 Hz frame rate conversion shows the worst performance since this frame rate conversion utilizes only 16.7% of an original frame (compared to 60 Hz to 120 Hz frame rate conversion which utilizes 50% of an original frame).

One or more embodiments provide a framework for detecting a location of a moving text region and restoring broken text in the region using averaged text corrected by motion estimation. The framework detects a rectangle of each moving text region despite an unconstrained background.

In one embodiment, the framework provides a generalized searching algorithm that accurately detects/locates a moving text region and makes corrections to the moving text region thereafter. The searching algorithm does not require any prior knowledge of any content channel that a moving text region may originate from, and does not require any training.

Typically, a moving text region is located/positioned within/under a bottom one-third of a frame (i.e., image/video frame) of content from a content channel. Further, a horizontal-center region (i.e., about one-third to two-third of width) of a frame typically contains a moving text region if it exists, excluding any static region. In one embodiment, a search region for the searching algorithm is identified as a sub-region of a frame of content, where the sub-region comprises a bottom and horizontal-center region of the frame that contains the moving text region. The searching process is coarse to fine in pyramid style to reduce burden and exclude any unrelated static regions, thereby optimizing search time and performance.

A line of text ("text line") in a frame often has a stronger vertical edge signal than other regions of the frame. Text is often displayed against/on a high contrast banner which has strong horizontal edge signal based on the contrast between the banner and a background scene. A ratio of horizontal edge signal to vertical edge signal generates sharp peaks while substantially flat elsewhere. In one embodiment, the searching algorithm utilizes a first set of distinguishable features ("first set of features") for detecting the moving text region with respect to a vertical axis (e.g., top or bottom) of a display, and further utilizes a second set of distinguishable features ("second set of features") for detecting the moving text region with respect to a horizontal axis (e.g., left or right) of the display.

In one embodiment, the framework performs a stabilization operation to handle one or more deviations based on analyzing one or more historical frames (i.e., previous frames) of content.

FIG. 1 illustrates an example computing architecture 100 for generalized moving text region detection for broken text recovery, in one or more embodiments. In one embodiment, the computing architecture 100 comprises at least one electronic device 200 including computing resources, such as one or more processor units 210 and one or more storage units 220. One or more applications 260 may execute/operate on the electronic device 200 utilizing the computing resources of the electronic device 200.

In one embodiment, the one or more applications 260 executing/operating on the electronic device 200 are configured to perform on-device (i.e., online) processing of content (e.g., a video) from a content channel. In one embodiment, the on-device processing comprises: (1) detecting/locating a location of a moving text region within frames (i.e., image/video frames) of the content using a generalized searching algorithm, and (2) correcting/restoring any broken text in the moving text region. The searching algorithm does not require any prior knowledge of any content channel that a moving text region may originate from, and does not require any training.

In one embodiment, the one or more applications 260 may further include one or more software mobile applications loaded onto or downloaded to the electronic device 200, such as a camera application, a social media application, a video streaming application, etc.

Examples of an electronic device 200 include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IoT) device, a cable box, a satellite receiver, etc.

In one embodiment, an electronic device 200 comprises one or more input/output (I/O) units 230 integrated in or coupled to the electronic device 200. In one embodiment, the one or more I/O units 230 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 230 to configure one or more parameters, provide user input, etc.

In one embodiment, an electronic device 200 comprises one or more sensor units 240 integrated in or coupled to the electronic device 200. In one embodiment, the one or more sensor units 240 include, but are not limited to, a RGB color sensor, an IR sensor, an illuminance sensor, a color temperature sensor, a camera, a microphone, a GPS, a motion sensor, etc.

In one embodiment, an electronic device 200 comprises a communications unit 250 configured to exchange data with a remote computing environment, such as a remote computing environment 110 over a communications network/connection 50 (e.g., a wireless connection such as a Wi-Fi connection or a cellular data connection, a wired connection, or a combination of the two). The communications unit 250 may comprise any suitable communications circuitry operative to connect to a communications network and to exchange communications operations and media between the electronic device 200 and other devices connected to the same communications network 50. The communications unit 250 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 110 includes computing resources, such as one or more servers 120 and one or more storage units 130. One or more applications 140 that provide higher-level services may execute/operate on the remote computing environment 110 utilizing the computing resources of the remote computing environment 110.

In one embodiment, the remote computing environment 110 provides an online platform for hosting one or more online services (e.g., an audio streaming service, a video streaming service, etc.) and/or distributing one or more applications. For example, an application 260 may be loaded onto or downloaded to the electronic device 110 from the remote computing environment 110 that maintains and distributes updates for the application 260. As another example, a remote computing environment 110 may comprise a cloud computing environment providing shared pools of configurable computing system resources and higher-level services.

Figure 2:
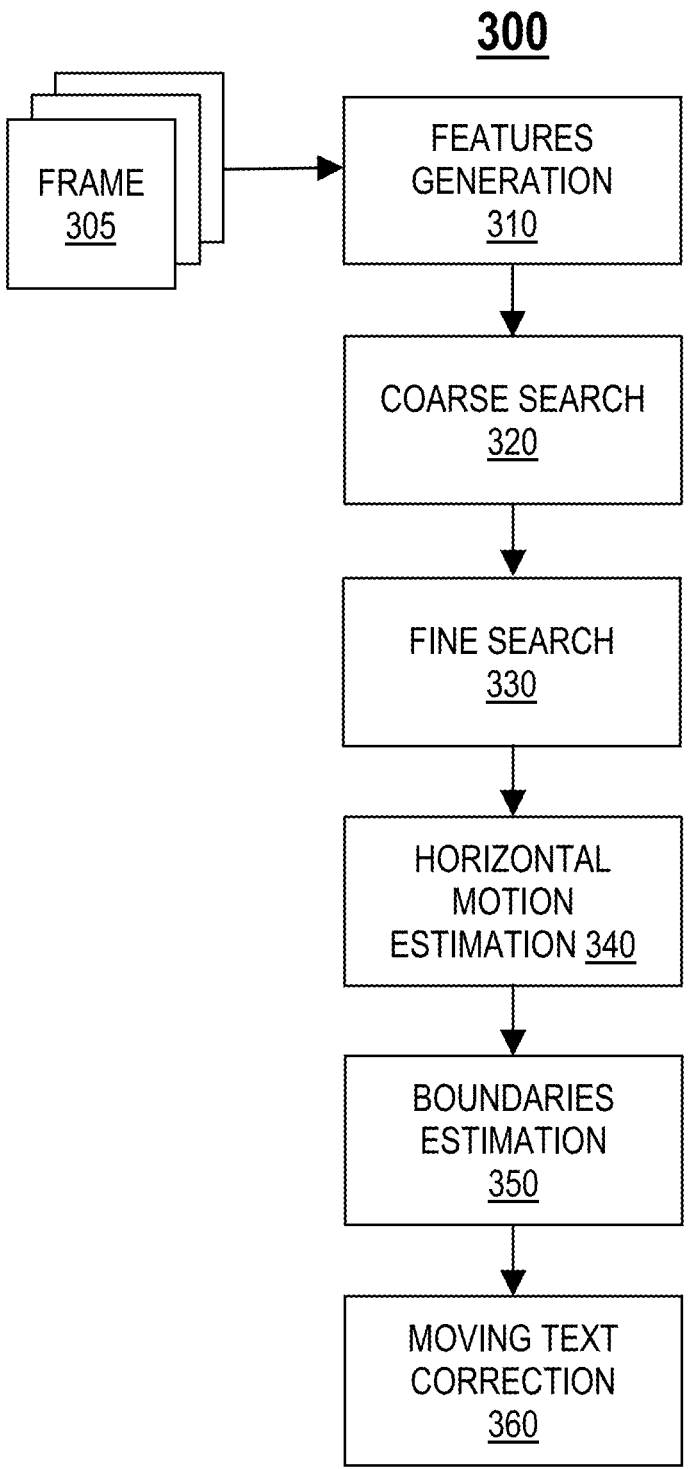
FIG. 2 illustrates an example generalized moving text region detection system for broken text recovery, in one or more embodiments.

FIG. 2 illustrates an example generalized moving text region detection system 300 for broken text recovery, in one or more embodiments. In one embodiment, one or more applications 260 (FIG. 1) executing/operating on an electronic device 200 (FIG. 1) include the generalized moving text region detection system 300. As described in detail herein, the system 300 implements a generalized searching algorithm that accurately detects/locates a moving text region and makes corrections to the moving text region thereafter, without requiring any training and any prior knowledge of any content channel that the moving text region may originate from.

In one embodiment, the generalized moving text region detection system 300 comprises a features generation unit 310 configured to receive, as input, a plurality of frames 305 (i.e., image/video frame) of content from a content channel. In one embodiment, the content is streamed, broadcast, or retrieved from a remote computing environment (e.g., remote computing environment 110 in FIG. 1).

In one embodiment, the features generation unit 310 is configured to utilize vertical edges and horizontal edges of multiple frames 305 of content to identify and generate features of the content. Specifically, for each frame i of a content, the features generation unit 310 determines a corresponding vertical edge strength V[i] (along a vertical direction) and a corresponding horizonal edge strength H[i] (along a horizontal direction) of the frame i. In one embodiment, a vertical edge strength V[i] and a horizonal edge strength H[i] of a frame i are determined in accordance with equations (1)-(2) provided below:

$$V[i] = \sum_j |pix[i, j] - pix[i, j+1]|, \text{ and} \tag{1}$$

$$H[i] = \sum_j |pix[i, j] - pix[i+1, j]|. \tag{2}$$

Next, for each frame i of a content, the features generation unit 310 normalizes a corresponding vertical edge strength V[i] and a corresponding horizonal edge strength H[i] of the frame i to obtain a corresponding normalized vertical edge strength Vnorm[i] and a corresponding normalized horizonal edge strength Hnorm[i] of the frame i. In one embodiment, a normalized vertical edge strength Vnorm[i] and a normalized horizonal edge strength Hnorm[i] of a frame i are obtained using 10 bit, in accordance with equations (3)-(4) provided below:

$$Vnorm[i] = 1023 \times V[i]/(V\max + 1), \text{ and} \tag{3}$$

$$Hnorm[i] = 1023 \times H[i]/(H\max + 1), \tag{4}$$

wherein $V\max = \max_{\forall k} V[k]$, and $H\max = \max_{\forall k} H[k]$.

Next, for each frame i of a content, the features generation unit 310 determine a corresponding ratio of horizontal edges to vertical edges HV[i] of the frame i. In one embodiment, a ratio of horizontal edges to vertical edges HV[i] of a frame i is determined in accordance with equation (5) provided below:

$$HV[i] = 1023 \times \max(1, Hnorm[i]) / \left( \frac{Vnorm[i] + Vnorm[i+1]}{2} + THdiv \right), \tag{5}$$

wherein THdiv is a regularization constant.

Next, for each frame i of a content, the features generation unit 310 normalizes a corresponding ratio of horizontal edges to vertical edges HV[i] of the frame i to obtain a corresponding normalized ratio of horizontal edges to vertical edges HVnorm[i] of the frame i. In one embodiment, a normalized ratio of horizontal edges to vertical edges HVnorm[i] of a frame i is obtained using 10 bit, in accordance with equation (6) provided below:

$$HVnorm[i] = 1023 \times HV[i]/(HVmax + 1), \quad (6)$$

$$\text{wherein } HVmax = \max_{\forall k} HV[k].$$

As described in detail later herein, a normalized vertical edge strength Vnorm[i] and a normalized ratio of horizontal edges to vertical edges HVnorm[i] of each frame i of a content are used to detect desired features/patterns of the content.

In one embodiment, the generalized moving text region detection system 300 comprises a coarse search unit 320. For each frame 305, the coarse search unit 320 is configured to detect/locate a coarse top and bottom pair of a moving text region based on an 100×160 image patch (i.e., pixel patch) segmented from a middle bottom (i.e., bottom and horizontal-center) portion of a sub-sampled grayscale image of size 270×480 pixels of the frame 305, wherein the 100×160 image patch excludes interference from unrelated areas/regions of the image (i.e., areas/regions that do not display a moving text region) and maintains a small search space. The coarse search unit 320 averages vertical edge signals among multiple frames 305 of content from a content channel to determine a peak point from the averaged vertical edge signals, wherein the peak point represents a peak strength and corresponding position. A set of distinguishable features/patterns ("features set") of the content channel is based on the peak point from the averaged vertical edge signals and the ratio of horizontal edge signals to vertical edge signals.

Let thrV generally denote a threshold for V features. In one embodiment, a threshold thrV is represented in accordance with equation (7) provided below:

$$thrV = \max\left(THmin, \frac{std(Vnorm)}{2}\right), \quad (7)$$

wherein TH min is a certain minimum value for the threshold thrV.

Let thrHV generally denote a threshold for HV features. In one embodiment, a threshold thrHV is represented in accordance with equation (8) provided below:

$$thrHV = std(HVnorm). \quad (8)$$

In one embodiment, the coarse search unit 320 determines target segments segV[k] and segHV[k] in accordance with equations (9)-(10) provided below:

$$segV[k] = \begin{cases} 1, & Vnorm[k] > thrV \\ 0, & \text{elsewhere} \end{cases}, \text{ and} \quad (9)$$

-continued $$segHV[k] = \begin{cases} 1, & \text{if } HVnorm[k] > thrHV \\ 0, & \text{elsewhere} \end{cases}. \quad (10)$$

In one embodiment, the coarse search unit 320 refines/merges target segments segV[k] and segHV[k] in accordance with given conditions. For example, in one embodiment, target segments segV[k] and segHV[k] are refined/merged with the following given conditions:

(1) drop head and tail segments;

(2) merge neighboring segments if all of the following is true: (a) length of gap between neighboring segments is small enough, (b) no segment segHV on gap, and $$(c) \min(V \text{ on gap}) > \frac{\max(V \text{ on neighboring segments})}{2};$$

and (3) discard disqualified segments that are too long or too short.

In one embodiment, the generalized moving text region detection system 300 comprises a fine search unit 330. For each frame 305, the fine search unit 330 is configured to detect/locate a fine top and bottom pair of a moving text region based on a 400×640 image patch (i.e., pixel patch) segmented from a middle bottom (i.e., bottom and horizontal-center) portion of a sub-sampled grayscale image of size 1080×1920 pixels of the frame 305. Each 400×640 image patch includes a coarse top and bottom pair (e.g., detected/located by the coarse search unit 320) of a moving text region.

In one embodiment, detecting/locating a fine top and bottom pair of a moving text region involves the following: (1) receiving a coarse top and bottom pair of the moving text region (e.g., from the coarse search unit 320), (2) starting from each side of the coarse top and bottom pair, applying Otsu thresholding (i.e., a 2-class classification method that maximizes inter-class variance) twice on H to obtain tight cuts and loose cuts of the moving text region, and further applying Otsu thresholding on HV to obtain boundary cuts of the moving text region, (3) using adjacent blocks (i.e., adjacent frames 305) to eliminate overcuts, and (4) saving and updating the tight cuts, the loose cuts, and the boundary cuts in a 20×400×3 buffer (frames×length×3 types), using a weighted filter (e.g., [1, 2, 3, 2, 1]) to obtain averages of the tight cuts, the loose cuts, and the boundary cut ("average cuts"), and using the average cuts to predict an ID (e.g., ID of content channel that a current frame 305 of content is from) of a current block (i.e., current frame 305) and the fine top and bottom pair.

In another embodiment, the fine search unit 330 only uses tights cuts of a moving text region to detect/locate a fine top and bottom pair of the moving text region.

In one embodiment, the generalized moving text region detection system 300 comprises a horizontal motion estimation unit 340 configured to estimate a horizontal motion vector of a moving text region. In one embodiment, estimating a horizontal motion vector of a moving text region involves the following: (1) receiving a pair of tight cuts of a top and bottom pair (e.g., from the fine search unit 330), (2) determining, based on the pair of tight cuts, an average grayscale by column to represent a horizontal line, and (3) searching/subsampling coarse to fine in pyramid style, and matching a central ⅓ segment with a previous horizontal line to determine a horizontal motion vector of moving text.

The searching process is coarse to fine in pyramid style to reduce burden and exclude any unrelated static regions, thereby optimizing search time and performance.

In another embodiment, a different sub-sampling scale is utilized by the coarse search unit 320 and/or the fine search unit 330 to adjust the searching process and in turn optimized search time and performance.

In one embodiment, the generalized moving text region detection system 300 comprises a boundaries estimation unit 350 configured to estimate left and right boundaries of a moving text region. Left and right boundaries of a moving text region are estimated using a difference between a motion compensated absolute difference (i.e., an absolute difference with motion correction) and a non-motion compensated absolute difference (i.e., an absolute difference without motion correction) at times t (i.e., a current frame 305) and t–1 (i.e., a previous frame 305) along x-axis. Specifically, estimating left and right boundaries of a moving text region involves the following: (1) determining a non-motion compensated absolute difference A between horizontal lines at times t and t–1, (2) determining a motion compensated absolute difference B between horizontal lines at times t and t–1, (3) determining a difference C between the motion compensated absolute difference B and the non-motion compensated absolute difference A, (4) determining a sum of the difference C over n frames (e.g., n=20), and (5) detecting boundaries of motion segments (negative segments in D). Therefore, the system 300 factors into account a difference between motion compensated image intensity of a previous frame 305 (i.e., a frame 305 at t–1) and non-motion compensated image intensity of the previous frame 305 when detecting left and right boundaries of a moving text region.

In one embodiment, the generalized moving text region detection system 300 comprises a moving text correction system 360 for broken text recovery. The moving text correction system 360 is configured to correct/recover broken text in a moving text region detected/located by the system 300, resulting in a restored moving text region with corrected/recovered text. In one embodiment, the moving text correction system 360 detects broken text in a moving text region by applying a moving average method using a simple finite impulse response (FIR) filter. In another embodiment, the moving text correction system 360 detects broken text in a moving text region by applying an infinite impulse response (IIR) filter with adaptive gain control from motion estimation. A gain of the IIR filter may be adjusted by various features such as matching error in motion estimation, etc.

Some portions of a restored moving text region may have irregular motion which causes judder at a final output. In one embodiment, the moving text correction system 360 performs a stabilization operation to handle one or more standard deviations (STD) based on analyzing one or more historical frames (i.e., previous frames) of the content. The stabilization operation removes judder at a final output by applying motion compensation with stabilized moving text motion to a restored moving text region.

The system 300 utilizes a first set of distinguishable features ("first set of features") for detecting/locating a moving text region with respect to a vertical axis (e.g., top or bottom) of a display, wherein the first set of distinguishable features include coarse/fine top and bottom pairs of the moving text region. The system 300 further utilizes a second set of distinguishable features ("second set of features") for detecting/locating the moving text region with respect to a horizontal axis (e.g., left or right) of the display, wherein the second set of distinguishable features include left and right boundaries of the moving text region. Therefore, the system 300 performs a search (via the coarse search unit 320, the fine search unit 330, the horizontal motion estimation unit 330, and the boundaries estimation unit 350) to refine a region of interest of moving text (i.e., moving text region). For each frame 305, the resulting search region for the generalized searching algorithm is a sub-region (i.e., image patch) of the frame 305, where the sub-region comprises a bottom and horizontal-center region of the frame 305 that contains moving text.

The system 300 is capable of detecting/locating a moving text region from bare pixel intensity, without having to detect characters within the moving text region beforehand.

Figure 3:
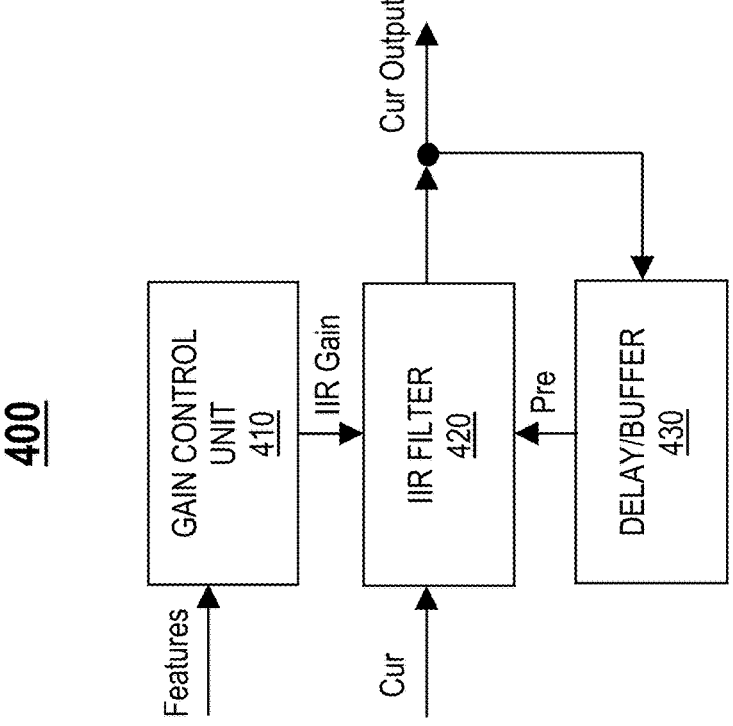
FIG. 3 illustrates an example moving text correction system for broken text recovery, in one or more embodiments.

FIG. 3 illustrates an example moving text correction system 400 for broken text recovery, in one or more embodiments. In one embodiment, the moving text correction system 360 in FIG. 2 is implemented as the moving text correction system 400. In one embodiment the moving text correction system 400 comprises a gain control unit 410, an IIR filter unit 420, and a delay/buffer unit 430.

The gain control unit 410 is configured to: (1) receive features (e.g., STD, etc.) relating to a moving text region detected/located by the system 300, and (2) generate an IIR gain based on the features. In one embodiment, an IIR gain is generated from features such as matching error in motion estimation, etc.

The IIR filter unit 420 is configured to: (1) receive a moving text region ("Cur"), (2) receive an IIR gain (e.g., from the gain control unit 410), (3) receive one or more historical frames (e.g., from the delay/buffer unit 430), (4) detect and correct/recover broken text in the moving text region by applying an IIR filter with the IIR gain, resulting in a restored moving text region with corrected/recovered text, and (5) based on an analysis of the one or more historical frames, applying motion compensation with stabilized moving text motion to the restored moving text region, resulting in a final output ("Cur Output") with judder removed.

The delay/buffer unit 430 is configured to: (1) receive a final output (e.g., from the IIR filter unit 420), (2) delay/buffer the final output, and (3) provide the delay/buffered final output as one or more historical frames.

Figure 4A:
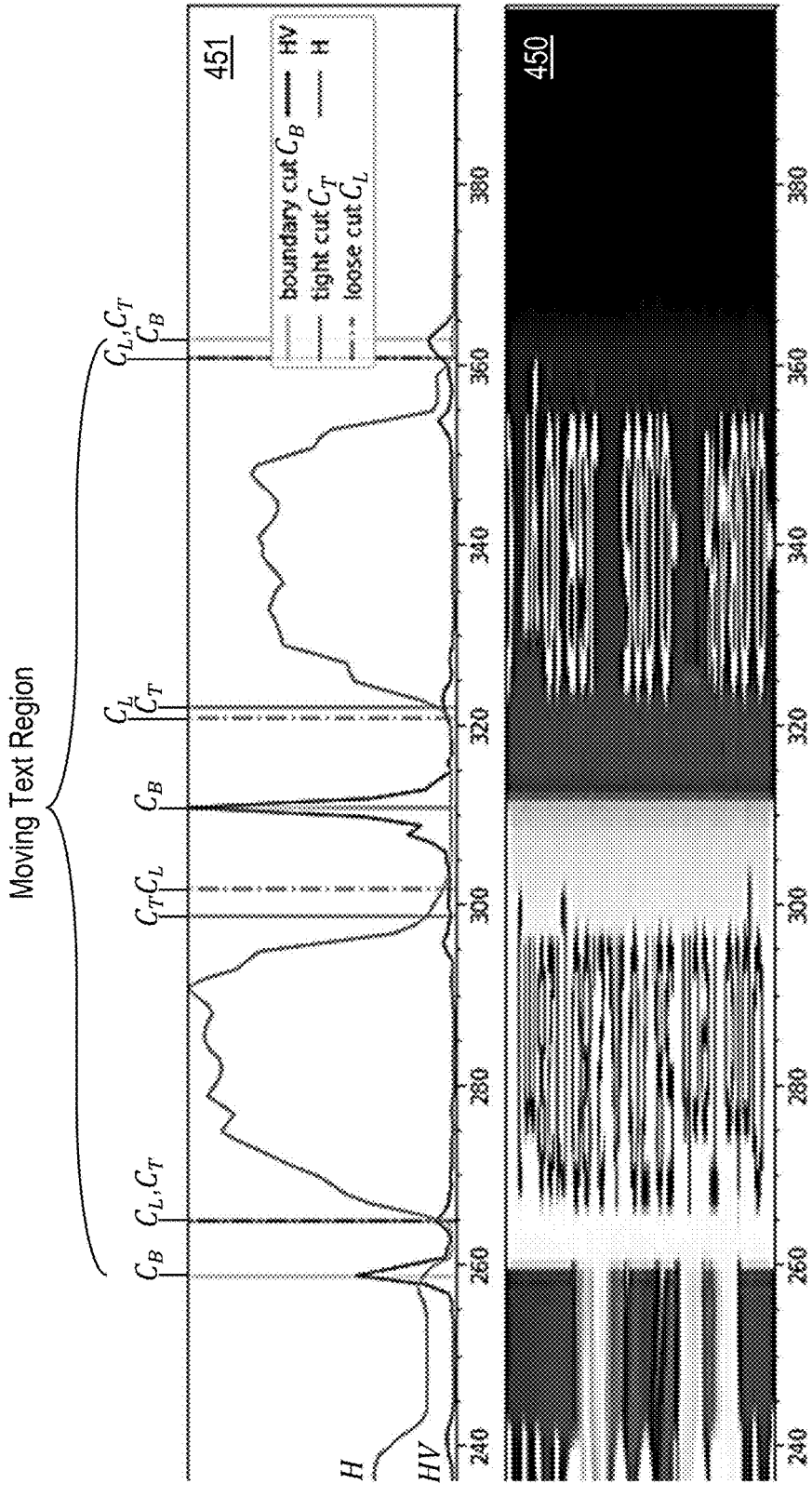
FIG. 4A illustrates example boundary cuts, tight cuts, and loose cuts obtained for a moving text region, in one or more embodiments.

FIG. 4A illustrates example boundary cuts, tight cuts, and loose cuts obtained for a moving text region, in one or more embodiments. In one embodiment, the system 300 (e.g., via the fine search unit 330) is configured to detect/locate a fine top and bottom pair of a moving text region based on a 400×640 image patch 450 segmented from a middle bottom (i.e., center bottom) of a sub-sampled grayscale image of size 1080×1920 pixels of a frame. The image patch 450 includes a coarse top and bottom pair (e.g., detected/located by the coarse search unit 320) of the moving text region.

A graph plot 451 representing H and HV is included in FIG. 4A. Starting from each side of the coarse top and bottom pair, the system 300 applies Otsu thresholding twice on H to obtain tight cuts $C_T$ and loose cuts $C_L$ of the moving text region, and further applies Otsu thresholding on HV to obtain boundary cuts $C_B$ of the moving text region.

Figure 4B:
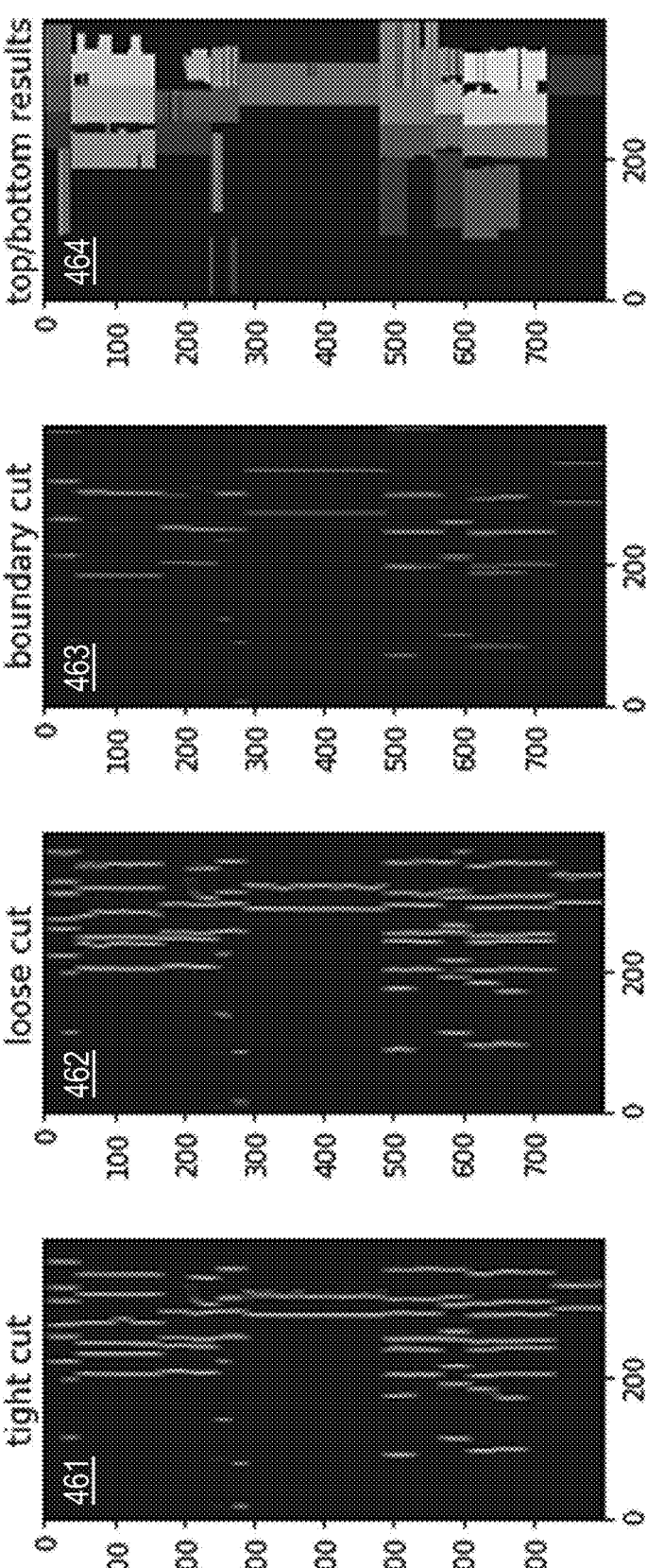
FIG. 4B illustrates example averages of boundary cuts, tight cuts, and loose cuts obtained for a moving text region, in one or more embodiments.

FIG. 4B illustrates example averages of boundary cuts, tight cuts, and loose cuts obtained for a moving text region, in one or more embodiments. In one embodiment, the system 300 (e.g., via the fine search unit 330) is configured to save and update tight cuts, loose cuts, and boundary cuts obtained for a moving text region in a buffer, use a weighted filter to obtain averages of the tight cuts, the loose cuts, and the boundary cut ("average cuts"), and use the average cuts to predict a fine top and bottom pair of the moving text region. Assuming the buffer maintains tight cuts, loose cuts, and boundary cuts obtained for moving text regions of eight hundred (800) frames of different content from eight (8) different content channels, FIG. 4B illustrates the following: (1) a first graph plot 461 representing averages of the tight cuts, (2) a second graph plot 462 representing averages of the loose cuts, (3) a third graph plot 463 representing averages of the boundary cuts, and (4) a fourth graph plot 464 representing fine top and bottom pairs predicted based on the average cuts.

Figure 5:
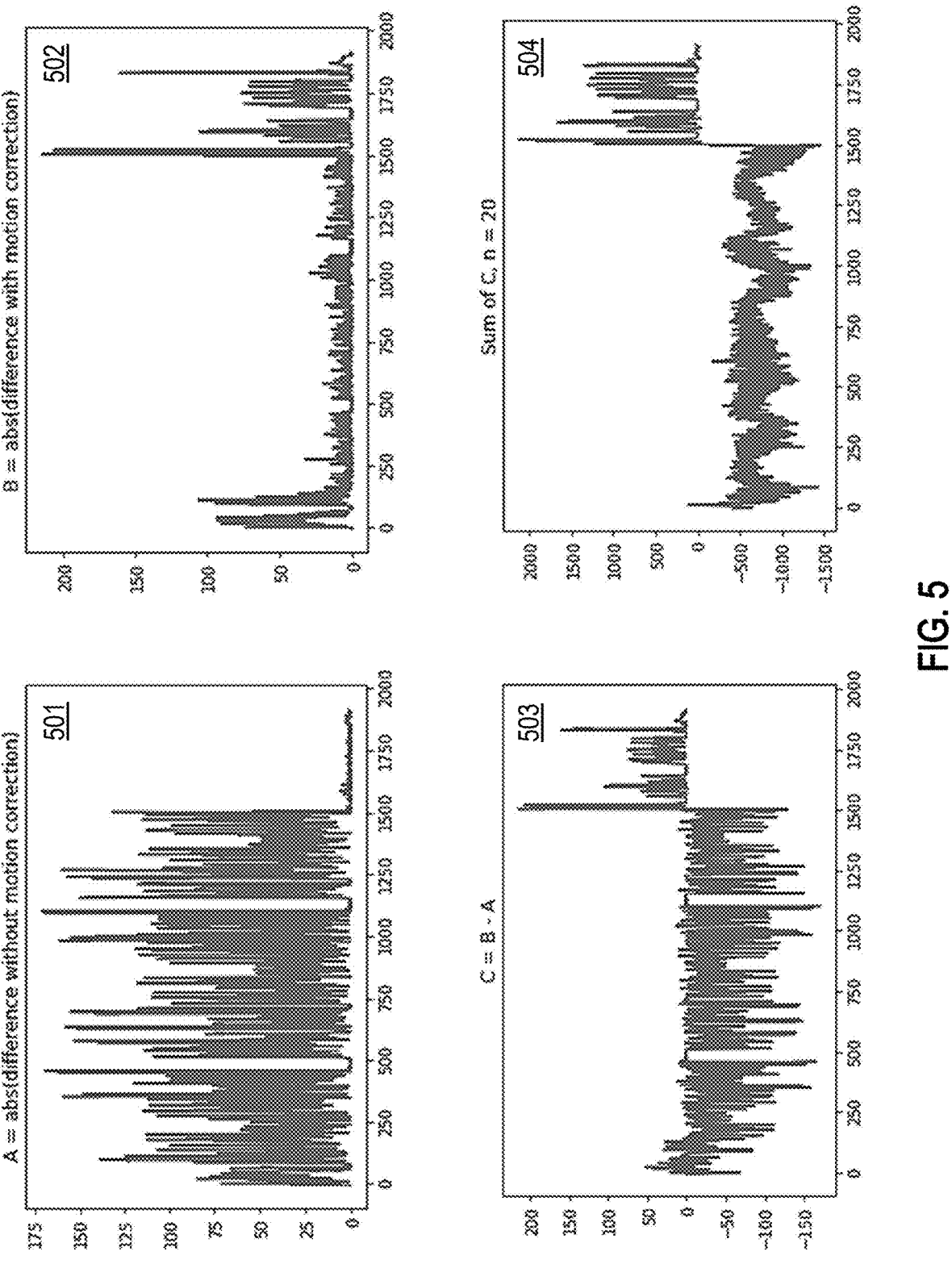
FIG. 5 illustrates example graph plots for estimating left and right boundaries of a moving text region, in one or more embodiments.

FIG. 5 illustrates example graph plots 501-504 for estimating left and right boundaries of a moving text region, in one or more embodiments. Specifically, FIG. 5 illustrates the following: (1) a graph plot 501 representing a non-motion compensated absolute difference A between horizontal lines at times t and t−1, (2) a graph plot 502 representing a motion compensated absolute difference B between horizontal lines at times t and t−1, (3) a graph plot 503 representing a difference C between the motion compensated absolute difference B and the non-motion compensated absolute difference A, and (4) a graph plot 504 representing a sum of the difference C over n frames, where n=20.

Figure 6:
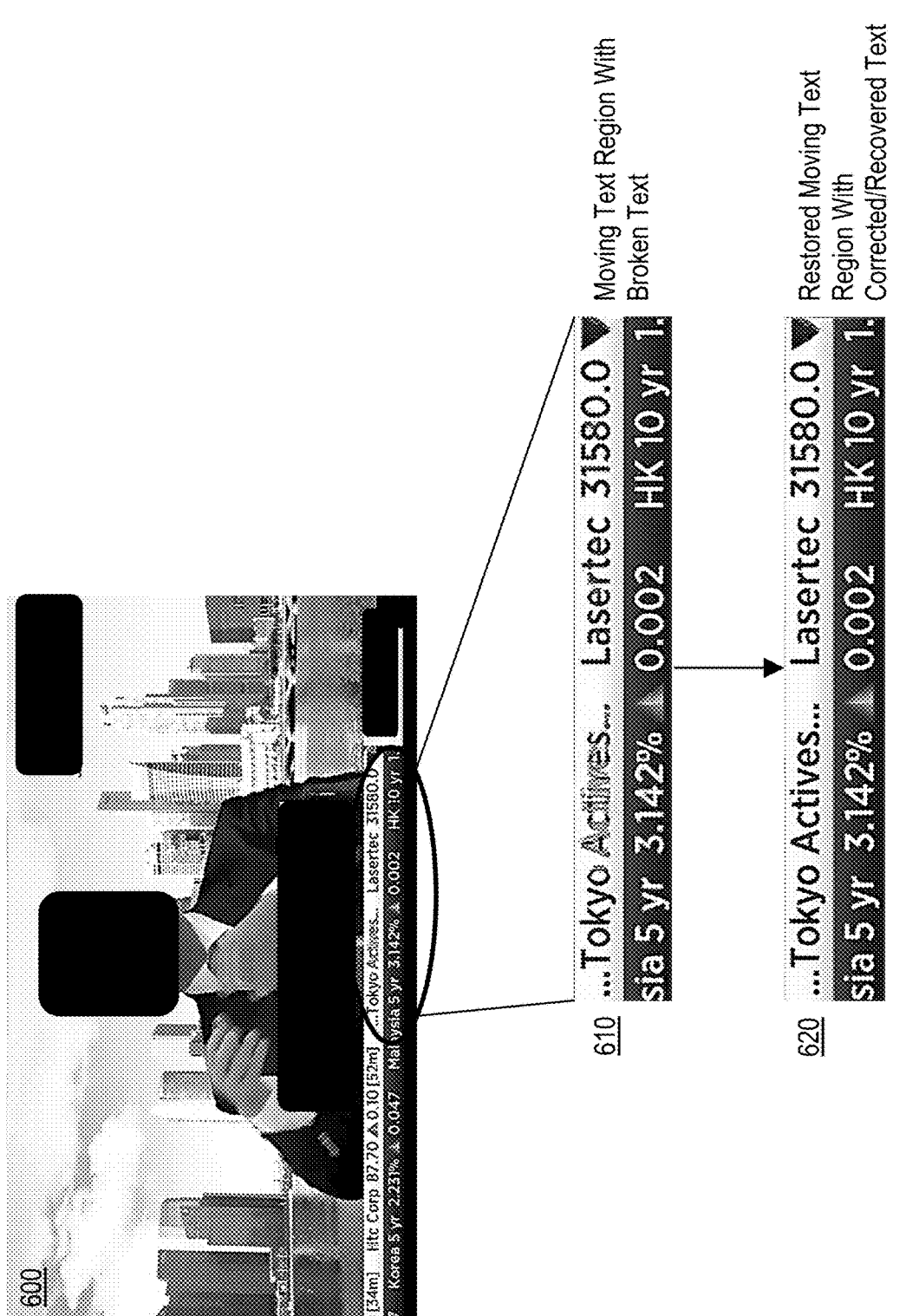
FIG. 6 illustrates a visual comparison between a moving text region with broken text and a restored moving text region with corrected/recovered text, in one or more embodiments.

FIG. 6 illustrates a visual comparison between a moving text region 610 with broken text and a restored moving text region 620 with corrected/recovered text, in one or more embodiments. In one embodiment, the system 300 receives one or more frames 600 of content from a content channel. For each frame 600, the system 300 detects/locates a moving text region 610 with broken text in the frame 600, and fixes/recovers the broken text, resulting in the restored moving text region 620 with corrected/recovered text.

FIG. 7 is a flowchart of an example process 700 for implementing generalized moving text region detection for broken text recovery, in one or more embodiments. Process block 701 includes receiving content for presentation on a display. Process block 702 includes obtaining a plurality of image patches from the content, where each image patch is segmented from a bottom and horizontal-center portion of a sub-sampled grayscale image of a frame of the content. Process block 703 includes applying a searching algorithm to the plurality of image patches to detect a region of interest of moving text in the content, where the searching algorithm utilizes a first set of features and a second set of features to detect the region of interest with respect to a vertical axis and a horizontal axis of the display, respectively. Process block 704 includes correcting one or more visual artifacts in the region of interest, where the one or more visual artifacts include broken text.

In one embodiment, process blocks 701-704 may be performed by one or more components of the system 300.

Figure 8:
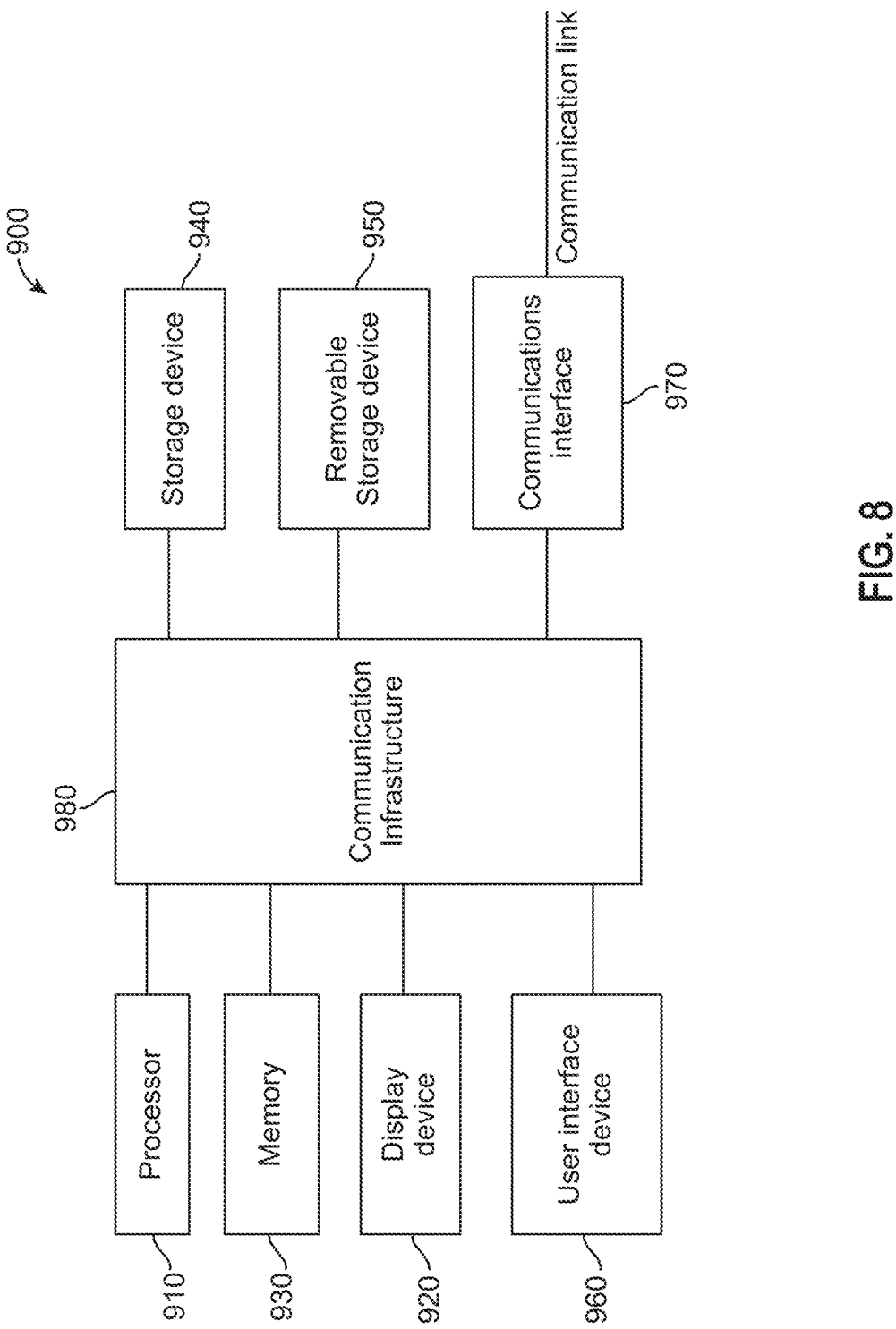
FIG. 8 is a high-level block diagram showing an information processing system comprising a computer system useful for implementing the disclosed embodiments.

FIG. 8 is a high-level block diagram showing an information processing system comprising a computer system 900 useful for implementing the disclosed embodiments. The system 300 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 700 (FIG. 7) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:

receiving content for presentation on a display;

obtaining a plurality of image patches from the content, wherein each image patch is segmented from a bottom and horizontal-center portion of a sub-sampled gray-scale image of a frame of the content;

applying a searching algorithm to the plurality of image patches to detect a region of interest of moving text in the content without prior detection of one or more characters within a moving text region and without training the searching algorithm, wherein the searching algorithm utilizes a first set of features and a second set of features to detect the region of interest with respect to a vertical axis and a horizontal axis of the display, respectively, and the first set of features is based on a peak point determined from averaged vertical edge signals; and correcting one or more visual artifacts in the region of interest, wherein the one or more visual artifacts include broken text.

2. The method of claim 1, further comprising:

analyzing one or more previous frames of the content; and performing a stabilization operation on the region of interest based on the analyzing to account for one or more standard deviations.

3. The method of claim 2, wherein the stabilization process comprises removing judder from the region of interest by applying motion compensation with stabilized moving text motion to the region of interest.

4. The method of claim 1, further comprising:

generating features of the content based on one or more horizontal edge signals and one or more vertical edge signals of one or more frames of the content; and determining the first set of features by applying coarse-to-fine searching to the plurality of image patches, wherein the coarse-to-fine searching utilizes the features of the content, and the first set of features is further based on a ratio of horizontal edge signals to vertical edge signals.

5. The method of claim 1, wherein the determining the first set of features comprises:

detecting a coarse top and bottom pair of the region of interest based on the plurality of image patches; and detecting a fine top and bottom pair of the region of interest based on the plurality of image patches.

6. The method of claim 1, further comprising:

determining the second set of features by performing horizontal motion estimation and estimating left and right boundaries of the region of interest based on the horizontal motion estimation.

7. The method of claim 1, wherein the correcting utilizes one of a finite impulse response (FIR) or an infinite impulse response (IIR) filter.

8. A system comprising:

at least one processor; and a non-transitory processor-readable memory device storing instructions that when executed by the at least one processor causes the at least one processor to perform operations including:

receiving content for presentation on a display;

obtaining a plurality of image patches from the content, wherein each image patch is segmented from a bottom and horizontal-center portion of a sub-sampled gray-scale image of a frame of the content;

applying a searching algorithm to the plurality of image patches to detect a region of interest of moving text in the content without prior detection of one or more characters within a moving text region and without training the searching algorithm, wherein the searching algorithm utilizes a first set of features and a second set of features to detect the region of interest with respect to a vertical axis and a horizontal axis of the display, respectively, and the first set of features is based on a peak point determined from averaged vertical edge signals; and correcting one or more visual artifacts in the region of interest, wherein the one or more visual artifacts include broken text.

9. The system of claim 8, wherein the operations further include:

analyzing one or more previous frames of the content; and performing a stabilization operation on the region of interest based on the analyzing to account for one or more standard deviations.

10. The system of claim 9, wherein the stabilization process comprises removing judder from the region of interest by applying motion compensation with stabilized moving text motion to the region of interest.

11. The system of claim 8, wherein the operations further include:

generating features of the content based on one or more horizontal edge signals and one or more vertical edge signals of one or more frames of the content; and determining the first set of features by applying coarse-to-fine searching to the plurality of image patches, wherein the coarse-to-fine searching utilizes the features of the content, and the first set of features is further based on a ratio of horizontal edge signals to vertical edge signals.

12. The system of claim 8, wherein the determining the first set of features comprises:

detecting a coarse top and bottom pair of the region of interest based on the plurality of image patches; and detecting a fine top and bottom pair of the region of interest based on the plurality of image patches.

13. The system of claim 8, wherein the operations further include:

determining the second set of features by performing horizontal motion estimation and estimating left and right boundaries of the region of interest based on the horizontal motion estimation.

14. The system of claim 8, wherein the correcting utilizes one of a finite impulse response (FIR) or an infinite impulse response (IIR) filter.

15. A non-transitory processor-readable medium that includes a program that when executed by a processor performs a method comprising:

receiving content for presentation on a display;

obtaining a plurality of image patches from the content, wherein each image patch is segmented from a bottom and horizontal-center portion of a sub-sampled gray-scale image of a frame of the content;

applying a searching algorithm to the plurality of image patches to detect a region of interest of moving text in the content without prior detection of one or more characters within a moving text region and without training the searching algorithm, wherein the searching algorithm utilizes a first set of features and a second set of features to detect the region of interest with respect to a vertical axis and a horizontal axis of the display, respectively, and the first set of features is based on a peak point determined from averaged vertical edge signals; and correcting one or more visual artifacts in the region of interest, wherein the one or more visual artifacts include broken text.

16. The non-transitory processor-readable medium of claim 15, wherein the method further comprises:

analyzing one or more previous frames of the content; and performing a stabilization operation on the region of interest based on analyzing to account for one or more standard deviations.

17. The non-transitory processor-readable medium of claim 16, wherein the stabilization process comprises removing judder from the region of interest by applying motion compensation with stabilized moving text motion to the region of interest.

18. The non-transitory processor-readable medium of claim 15, wherein the method further comprises:

generating features of the content based on one or more horizontal edge signals and one or more vertical edge signals of one or more frames of the content; and determining the first set of features by applying coarse-to-fine searching to the plurality of image patches, wherein the coarse-to-fine searching utilizes the features of the content, and the first set of features is further based on a ratio of horizontal edge signals to vertical edge signals.

19. The non-transitory processor-readable medium of claim 15, wherein the determining the first set of features comprises:

detecting a coarse top and bottom pair of the region of interest based on the plurality of image patches; and detecting a fine top and bottom pair of the region of interest based on the plurality of image patches.

20. The non-transitory processor-readable medium of claim 15, wherein the method further comprises:

determining the second set of features by performing horizontal motion estimation and estimating left and right boundaries of the region of interest based on the horizontal motion estimation.

\* \* \* \* \*